US005730008A

United States Patent [19]

Case et al.

[11] Patent Number: 5,730,008

[45] Date of Patent: Mar. 24, 1998

[54] SNOWMOBILE TRACK LOCK

[76] Inventors: Willard L. Case, 12755 Bowens Mill Rd., Wayland, Mich. 49348; Willard J. Case, 1545 Brookmark St., SE., Kentwood, Mich. 49508

[21] Appl. No.: 540,840

[22] Filed: Oct. 11, 1995

[51] Int. Cl.$^6$ .......................... B62O 55/205; E05B 25/00

[52] U.S. Cl. .................................... 70/18; 70/58; 70/233; 70/236; 70/53; 70/237; 180/190

[58] Field of Search .................................... 70/18, 19, 14, 70/233, 235, 227, 209, 211, 212, 237, 238, 39, 38 A, 38 C, 53, 54, 51, 55, 56, 57, 58, 236; 180/190

[56] References Cited

U.S. PATENT DOCUMENTS

| | | | |
|---|---|---|---|
| 2,479,199 | 8/1949 | Bennett et al. | 70/38 A |
| 2,700,289 | 1/1955 | Morgan | 70/214 |
| 3,613,409 | 10/1971 | Paioletti | 70/38 A |
| 3,855,824 | 12/1974 | Falk | 70/38 A |
| 4,426,861 | 1/1984 | Chillis | 70/233 |
| 4,551,997 | 11/1985 | Huang | 70/38 A |
| 4,748,832 | 6/1988 | Patton | 70/38 A |
| 4,896,519 | 1/1990 | Pitts | 70/18 |
| 4,998,422 | 3/1991 | Borgmann et al. | 70/38 A |
| 5,265,449 | 11/1993 | Rasleigh | 70/18 |
| 5,419,408 | 5/1995 | Ellrodt et al. | 70/226 |

FOREIGN PATENT DOCUMENTS

| | | | |
|---|---|---|---|
| 3212281 | 10/1983 | Germany | 70/38 A |
| 3228613 | 2/1984 | Germany | 70/38 A |

*Primary Examiner*—Darnell M. Boucher
*Attorney, Agent, or Firm*—Warner Norcross & Judd

[57] ABSTRACT

A snowmobile track lock having a generally U-shaped track member interconnected with a lock body. The track member is fitted over the snowmobile track and secured in place by the interconnected lock body. A handle extends from the track member to facilitate installation of the track lock. Additionally, a flag is mounted to the track lock to remind the operator to remove the track lock before operating the snowmobile.

8 Claims, 2 Drawing Sheets

SNOWMOBILE TRACK LOCK

BACKGROUND OF THE INVENTION

The present invention relates to anti-theft devices, and more particularly to an anti-theft device for a snowmobile.

Snowmobiles are steadily increasing in popularity. The increase in popularity has been accompanied by an increase in snowmobile thefts. Perhaps the simplest and most popular method for deterring snowmobile theft is to install a track lock on the snowmobile when it is not in use. A conventional snowmobile track lock is shown in Rashleigh U.S. Pat. No. 5,265,449 issued Nov. 30, 1993. Rashleigh discloses an elongated main arm member and a parallel auxiliary arm member that are intersecured at one end to define a bight for receiving the snowmobile track. At the opposite end, the arm members are shaped to contact each other, however, they are not interconnected. A hole is defined in the unconnected end of each arm member. The holes are aligned with each other to receive the shank of a padlock. To install the track lock, the two arm members must be spread apart while sliding the track lock over the snowmobile track. After the track lock is fitted over the snowmobile track, the padlock is installed through the holes to secure the track lock in place.

The Rashleigh track lock can be awkward to install because it requires that the arm members be spread while the track lock is slid over the track. This manipulation can be particularly difficult when the snowmobile operator has cold or numb hands. Additionally, the snowmobile operator must install a padlock on the track lock to secure it in place. The padlock must be stored and maintained by the operator. Once installed, the padlock shank is readily accessible to the bolt cutters of a would-be-thief. Further, the design of the Rashleigh track lock makes it easy for the operator to accidentally or inadvertently operate the snowmobile while the track lock is still installed, potentially causing injury to the operator and the machine.

SUMMARY OF THE INVENTION

The aforementioned problems are overcome by the present invention which provides a snowmobile anti-theft device having a locking member interconnected with a conventional lock body. The device further includes a handle for facilitating installation of the device and a flag to remind the snowmobile operator to remove the device.

In a preferred embodiment, the locking member is generally U-shaped and includes free ends that are adapted to operationally interfit with a conventional lock body. The first free end includes a pair of annular recesses that interact with the internal mechanisms of the lock body to intersecure the locking member and the lock body. The second end includes a recess that can be selectively secured within the lock body. The handle is secured to the end of the locking member opposite the lock body. The reminder flag is preferably secured to the handle atop a flexible stem.

The present invention provides a simple, effective anti-theft device for a snowmobile. The device is easily installed on the track using the provided handle. The integral design facilitates installation and storage. Additionally, the reminder flag helps to prevent inadvertent or accidental use of the snowmobile while the device is installed.

These and other objects, advantages, and features of the present invention will be more readily understood and appreciated by reference to the detailed description of the preferred embodiments and the drawings.

DETAILED DESCRIPTION OF THE PREFERRED EMBODIMENT

Figure 1:
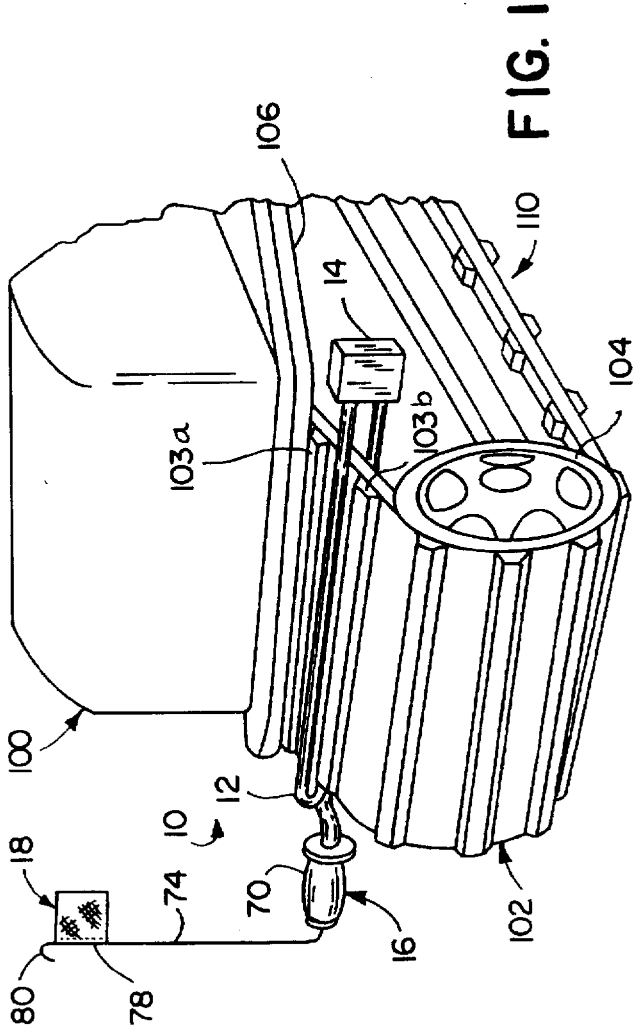
FIG. 1 is a perspective view of the anti-theft device installed on a conventional snowmobile.
Figure 2:
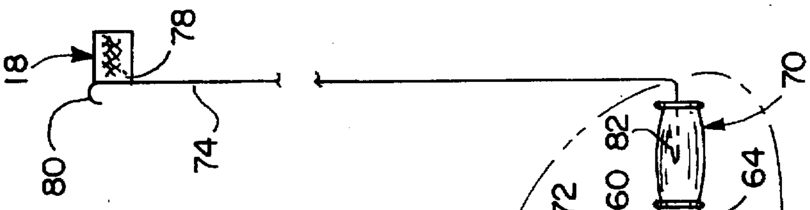
FIG. 2 is front elevational view of the anti-theft device.
Figure 2:
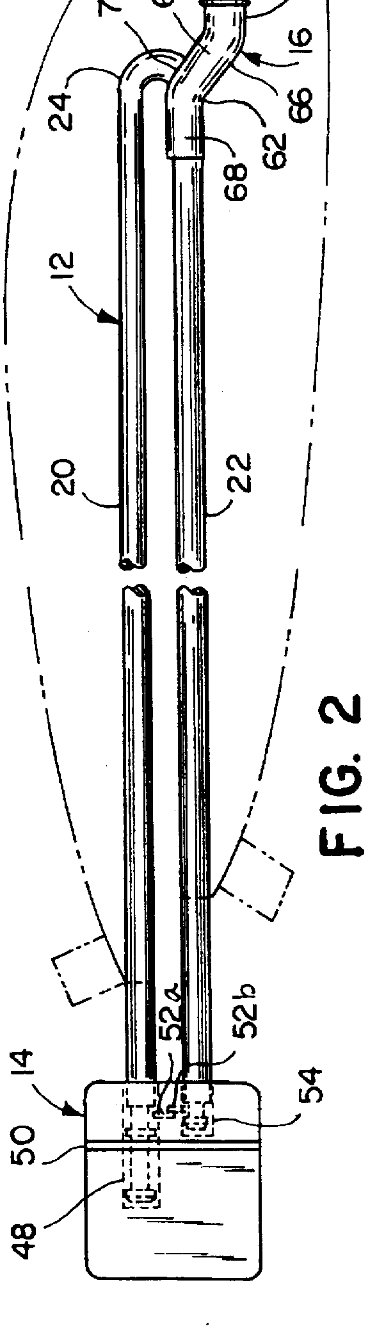

A snowmobile track lock in accordance with a preferred embodiment of the present invention is illustrated in FIG. 1 and generally designated 10. As illustrated, the track lock 10 includes a track member 12 and a lock body 14, and is designed for use with a snowmobile 100 having a conventional bogey and track arrangement 110. The track member 12 is fitted over the snowmobile track 102 above the rear bogey 104. With some track designs, it may be possible to install the track lock 10 at other locations along the track 102. The track lock 10 is positioned between adjacent tread members **103*a–b* so that it cannot be slidably moved along the track 102. Once fitted over the track 102, the lock body 14 is closed on the track member 12 to secure the track lock 10 in place. The track lock 10 is provided with a handle 16 to facilitate installation and a flag 18 to remind the operator to remove the track lock 10 before operating the snowmobile 100. When the track lock 10 is installed, the snowmobile cannot be driven or towed because the track lock 10 will engage the track tunnel 106 to restrict movement of the track 102**.

Figure 3:
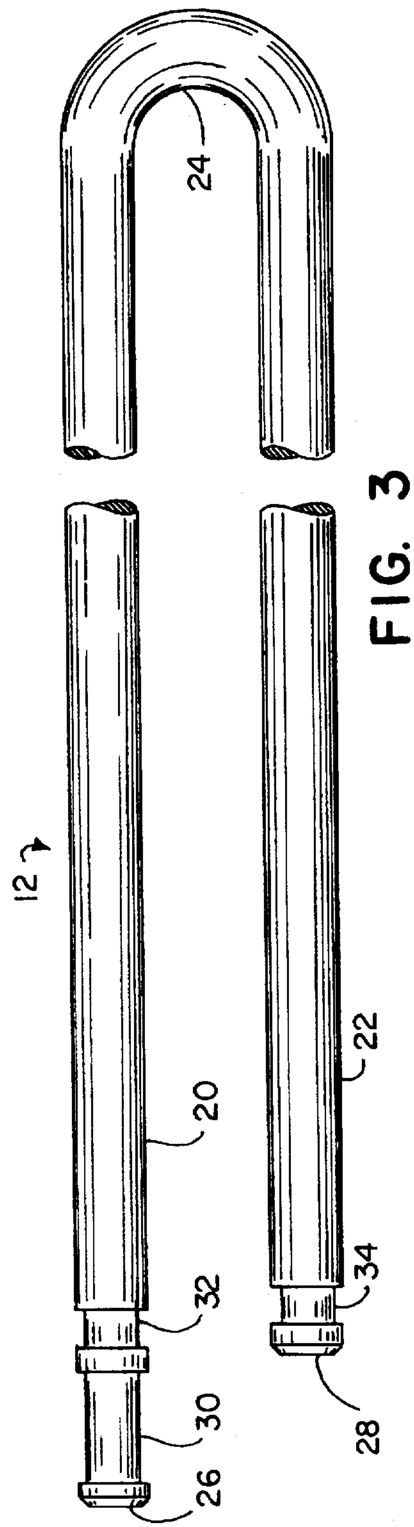
FIG. 3 is a front elevational view of the locking member.

The track member 12 is preferably U-shaped and includes first and second legs 20 and 22 extending from opposite sides of bend 24. As perhaps best illustrated in FIG. 3, leg 20 is slightly longer than leg 22. The variation in length between the legs 20 and 22 is necessary for the track member 10 to properly interfit and interact with the lock body 14. The relative length of these legs can vary from application to application depending on the specifications of the lock body 14. However, in the preferred embodiment, leg 20 is approximately 15/16 inches longer than leg 22. Track member 12 is preferably a one-piece component manufactured from cold rolled steel. The diameter of the steel is selected to provide the desired balance between weight, cost, and security. The free ends 26 and 38 of the track member 12 can be turned down if necessary to properly interfit with the lock body 14. Alternatively, track member 12 can be manufactured from separate elements that are interconnected to form a generally U-shaped component. In either case, the legs 20 and 22 are preferably spaced apart approximately ¾ inches so that they closely fit on the track 102 between adjacent tread members (not shown). This spacing can be varied to match the width of any snowmobile track.

Each leg 20 and 22 includes a free end 26 and 28, respectively, that is adapted to interfit and interact with a conventional padlock body 14. Preferably, both ends are chamfered to facilitate insertion into the lock body 14. Free end 26 includes an annular mounting recess 30 and an annular locking recess 32. Mounting recess 30 is adapted to interlock with the locking laminate 50 of the lock body 14 as described below. Locking recess 32 is adapted to selectively interlock with the locking plate **52*a* of the lock body 14 as described below. The location, depth, and width of the recesses 30 and 32 are defined by the specifications of the lock body 14. The present invention preferably incorporates the lock body from a conventional 7/16 inch, interchangeable-shank Masterlock Model No. 27. To correspond with this lock body 14, mounting recess 30 begins approximately ⅛ inches inward from end 26, and is preferably ⅝ inches wide and approximately 3/32 inches deep. Similarly, locking recess 32 begins approximately 1/8 inches inward from mounting recess 30, and is preferably 3/16 inches wide and 3/32 inches deep. Free end 28 includes a single annular locking recess 34 adapted to selectively interlock with locking plate 52b. To correspond with a conventional 3/16 inch, interchangeable-shank Masterlock, locking recess 34 begins approximately 3/16 inches inward from end 28, and is preferably 3/16 inches wide and 3/32 inches deep. Annular recesses 32 and/or 34** can be replaced by similarly dimensioned notches opening toward the opposite leg.

Handle 16 is secured to the track member 12 to facilitate installation of the track lock 10. The handle 16 is preferably manufactured from tubular steel having an internal diameter substantially equal to the exterior diameter of the track member 12. The handle includes a pair of approximately 45 degree bends 60 and 62 which divide the handle into three segments 64, 66, and 68. Segment 64 extends substantially parallel to leg 22 and is fitted with a hand or gripping element grip 70, such as a conventional bicycle hand grip. Segment 68 is adapted to receive leg 22. A hole 72 is defined in bend 62. Leg 22 passes through hole 72 and extends through the center of segment or stem portion 68. The handle 16 and leg 22 are intersecured by welding or other conventional methods.

Flag 18 is secured to handle 16 atop a flexible stem 74. The flexible stem 74 is preferably manufactured from blue spring steel or other sufficiently strong and flexible materials. The flag 18 can be selectively raised to remind the operator to remove the track lock 10 before operating the snowmobile. The flag is preferably manufactured from vinyl, plastic, cloth or other conventional sheet material. The flag color is selected to be highly visible. The flag 18 preferably includes a marginal portion that is doubled over and sewn or otherwise sealed to form a sleeve 78. The sleeve 78 is fitted over the upper end of stem 74 to secure the flag 18 to the stem 74. The upper end of stem 74 includes a hook 80 that can be hooked over leg 20 or leg 22 to hold the stem and flag down for storage. The lower end of the stem includes a V-shaped bend 82. The legs of bend 82 forcibly engage the inside walls of handle segment 64 to secure the flag 18 to the track lock 10. A small opening (not visible) is defined in the hand grip 70 to allow the stem 74 to pass therethrough.

With the exception of free ends 26 and 28, the track member 12 and handle 16 are preferably coated with a layer of plastic or vinyl. The coating protects the track lock 10 from corrosion and also protects the snowmobile from nicks and scratches.

As noted above, the lock body 14 is a conventional 7/16 inch, interchangeable-shank Masterlock. This and other similar lock bodies are commercially available from a number of well know suppliers. While various other lock bodies can be incorporated into the present invention, it may be necessary to specially adapt the free ends 26 and 28 to interfit and interact with the alternate lock body. The lock body 14 includes a shank mounting bore 48 that receives free end 26 and a locking bore 54 that receives free end 28. The lock body further includes a locking laminate 50 having a slot (not shown) that engages mounting recess 30 to securely mount the track member 12 to the lock body 14. When purchased, the locking laminate 50 is in an open position which allows insertion of free end 26 in to mounting bore 48. Once, inserted the locking laminate 50 can be closed to permanently secure the lock body 14 to the track member 12. Additionally, the lock body 14 includes a pair of locking plates 52a–b that selectively extend into and retract from bores 48 and 54. When extended, the locking plates 52a–b interlock with recesses 32 and 34 to secure the track lock 10 in the locked position. The locking plates 52a–b are extended and retracted by operation of a conventional key and tumbler arrangement.

Manufacture and Use

The present invention is manufactured by machining an appropriate length of cold rolled steel to form mounting recess 30 and locking recesses 32, and 34. Additionally, opposite ends of the steel are chamfered. Next, the machined steel is bent into a U-shape having parallel legs 20 and 22 spaced approximately 3/4 inches apart. The machined and bent steel is then heat treated to make it difficult for a would-be thief to cut off the track lock 10.

The handle 16 is manufactured by cutting a section of tubular steel to the appropriate length and forming two approximately 45 degree bends 60 and 62. A hole 72 is cut through bend 62 in axial alignment with section 68. The diameter of hole 72 is selected to fit around leg 22. The handle 16 is fitted to the track member 12 by insert free end 26 into hole 72 and sliding the handle 16 along leg 22 until section 68 engages bend 24. The handle is welded to the track member 10 in this position.

Next, the handle 16 and track member 12 are sand blasted and primed as necessary to prepare for application of a vinyl or plastic coating. The coating is applied using a conventional dipping process.

The flag 18 is cut to shape, and its marginal portion is doubled over and sewn or otherwise sealed to form sleeve 78. The sleeve 78 is fitted over the upper end of stem 74. If desired, the flag 18 can be secured in place by an adhesive. The upper end of the stem 74 is formed into hook 80, and the lower end is formed into V-shaped bend 82. The stem 74 is then inserted into hand grip 70. The hand grip 70 and stem 74 are then mounted to handle 16 by sliding the hand grip 70 around the outside of section 64 and bend 82 into the internal bore of section 64.

The lock body 14 is secured to the track member 12 by inserting free end 26 into mounting bore 48 and closing the locking laminate 50 around recess 30. Once closed, the track member 12 is permanently interconnected with the lock body 14. The track member 12 is free to rotate and move within the mounting bore 48 as though it were a conventional lock shank.

In use, the track lock 10 is installed on the snowmobile track 102 above the rear bogey 104. First, the track member 12 is grasped by handle 16 and slid over the track 102 between adjacent tread members (not shown). Legs 20 and 22 are positioned on opposite sides of the track. Once fitted over the track 102, the lock body 14 is closed on the track member 12 by inserting free end 28 into locking bore 54 until the locking plates 52a–b snap into recesses 32 and 34. The flag 18 is then raised to remind the operator to remove the track lock 10 before operating the snowmobile. The track lock 10 is removed from the track 102 by unlocking the lock body 14 using the appropriate key and then reversing the above process.

Alternative Embodiment

Figure 4:
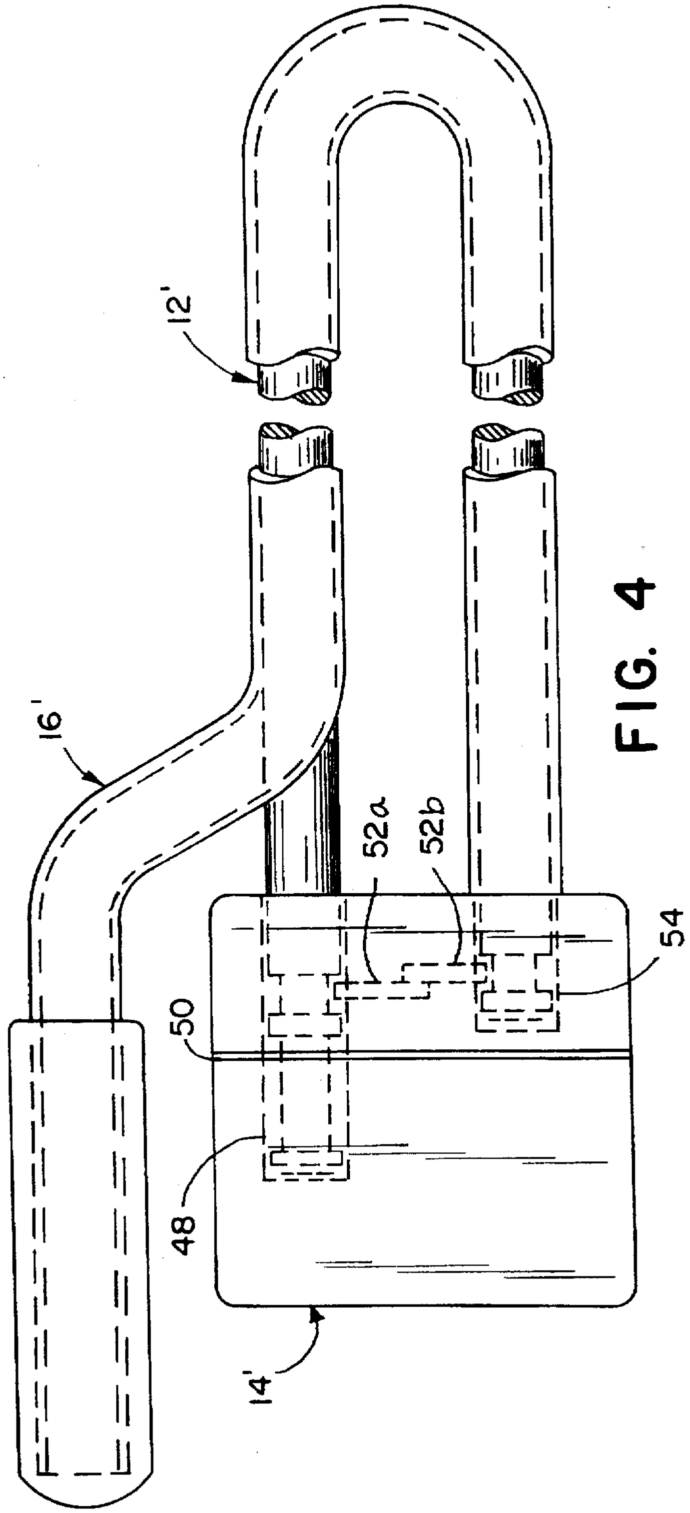
FIG. 4 is a front elevational view of an alternative anti-theft device.

An alternative embodiment is illustrated in FIG. 4. The alternative embodiment includes a track member 12' and lock body 14' generally identical to those described in connection with the preferred embodiment. However, the handle 16' extends from the end of the track member 12 adjacent the lock body 14 as contrasted with the preferred embodiment in which the handle extends from the end of the track member opposite the lock body. In this embodiment, the handle 16' can extend around the entire exposed length of the track member 12 to provide additional protection against cutting or breaking of the track lock 10'. To manufacture this embodiment, the handle 16' is fitted over the track member and both components are bent into a U-shape simultaneously.

The above description is that of preferred embodiments of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A snowmobile track lock comprising:

a track member having an outer diameter, said track member being a one-piece, U-shaped component having a bend interconnecting a pair of spaced-apart legs, each of said legs including first and second ends a lock body defining a mounting bore and a locking bore, one of said second ends being permanently interlocked with said mounting bore and the other of said second ends being selectively interlocked with said locking bore; and a handle secured to said track member opposite said lock body, said handle being tubular and defining an internal bore extending longitudinally through said handle, said internal bore having a diameter substantially equal to said outer diameter of said track member, said handle further defining an aperture extending transversely through said handle in communication with said internal bore, said track member extending through said aperture in said handle and through at least a portion of said internal bore said handle including a stem portion secured to said track member and a gripping portion extending outwardly from said stem portion and said track member to provide a gripping element for holding said track lock during installation and removal.

2. The track lock of claim 1 further comprising a reminder flag secured to said handle.

3. The track lock of claim 2 wherein one of said legs is longer than the other of said legs.

4. The track lock of claim 3 wherein said body includes a second locking plate the shorter of said legs including a locking recess adapted to selectively interlock with said second locking plate.

5. An anti-theft device for a tracked vehicle comprising:

a locking body defining a mounting bore and a locking bore, said locking body including a locking laminate extending into said mounting bore and a locking plate selectively extending into said locking bore;

a one-piece, U-shaped track member having an outer diameter and a bend interconnecting first and second legs, said first and second legs terminating at first and second free ends, said first leg being longer than said second leg, said first free end defining a mounting recess interlocked with said locking laminate thereby securing said first leg within said mounting bore, said second free end defining a locking recess adapted to be selectively interlocked with said locking plate thereby permitting said second leg to be selectively locked within said locking bore; and a handle secured to said track member opposite said lock body, said handle being tubular and defining an internal bore extending longitudinally through said handle, said internal bore having a diameter substantially equal to said outer diameter of said track member, said handle further defining an aperture extending transversely through said handle in communication with said internal bore, said track member extending through said aperture in said handle and through at least a portion of said internal bore said handle including a stem portion secured to said track member and a gripping portion extending outwardly from said stem portion and said track member to provide a gripping element for holding said track lock during installation and removal.

6. The anti-theft device of claim 5 further comprising a reminder flag secured to said handle.

7. The anti-theft device of claim 6 wherein said body includes a second locking plate selectively extending into said locking bore, said second leg including a locking recess adapted to interlock with said second locking plate when said locking plate is extended into said locking bore.

8. A track lock for a snowmobile comprising:

a track member adapted to be slid over a snowmobile track, said track member being U-shaped and including a pair of legs, said track member having an outer diameter, each of said legs having first and second ends, said first ends being interconnected at a bend;

a locking device integrally mounted to said track member opposite said bend, said locking device being operable between a locked position in which said locking device is connected to both of said second ends and an open position in which said locking device is connected solely to one of said second ends;

a handle secured to said track member opposite said lock body, said handle being tubular and defining an internal bore extending longitudinally through said handle, said internal bore having a diameter substantially equal to said outer diameter of said track member, said handle further defining an aperture extending transversely through said handle in communication with said internal bore, said track member extending through said aperture in said handle and through at least a portion of said internal bore; and a flexible reminder flag having a first end permanently secured to said handle and a second end defining a hook, said hook adapted to fit around said track member whereby said hook can be selectively attached to said track member to lower said flag for storage and said hook can be released from said track member to raise said flag to serve as a reminder.

* * * * *